United States Patent [19]

Pfandl et al.

[11] Patent Number: 5,761,361
[45] Date of Patent: Jun. 2, 1998

[54] ELONGATED OPTICAL TRANSMISSION ELEMENT

[75] Inventors: Walter Pfandl, Ahorn; Reiner Schneider, Ebersdorf, both of Germany

[73] Assignee: Siemens Aktiengesellschaft, Munich, Germany

[21] Appl. No.: 639,348

[22] Filed: May 1, 1996

[30] Foreign Application Priority Data

May 10, 1995 [DE] Germany ............ 195 17 118.7

[51] Int. Cl.$^6$ ........................ G02B 6/44
[52] U.S. Cl. ............ 385/100; 385/103; 385/105; 385/110; 385/113; 385/112
[58] Field of Search ............ 385/102, 104, 385/105, 106, 107, 108, 100, 101, 103, 109, 110, 111, 112, 113, 114

[56] References Cited

U.S. PATENT DOCUMENTS 4,000,936  1/1977  Gloge ............ 385/102

FOREIGN PATENT DOCUMENTS

| | | | |
|---|---|---|---|
| 0 165 632 | 9/1991 | European Pat. Off. | |
| 42 11 489 | 10/1993 | Germany. | |
| 60-37508 | 2/1985 | Japan | 385/102 |
| 60-154204 | 8/1985 | Japan | 385/102 |
| 60-216317 | 10/1985 | Japan | 385/102 |
| 61-185710 | 8/1986 | Japan | 385/102 |

*Primary Examiner*—John Ngo
*Attorney, Agent, or Firm*—Hill & Simpson

[57] ABSTRACT

An elongated optical transmission element has a plurality of light waveguides which are continuously mechanically connected to one another in various planes to form a structure extending in a longitudinal direction so that the cohesion between waveguides is essentially obtained by connections on the inside of the structure. The structure can be used in an optical and/or electrical lead and is used in optical and/or electrical cables.

13 Claims, 5 Drawing Sheets

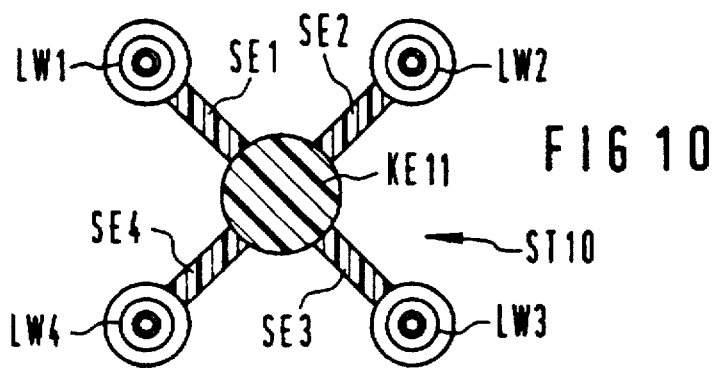
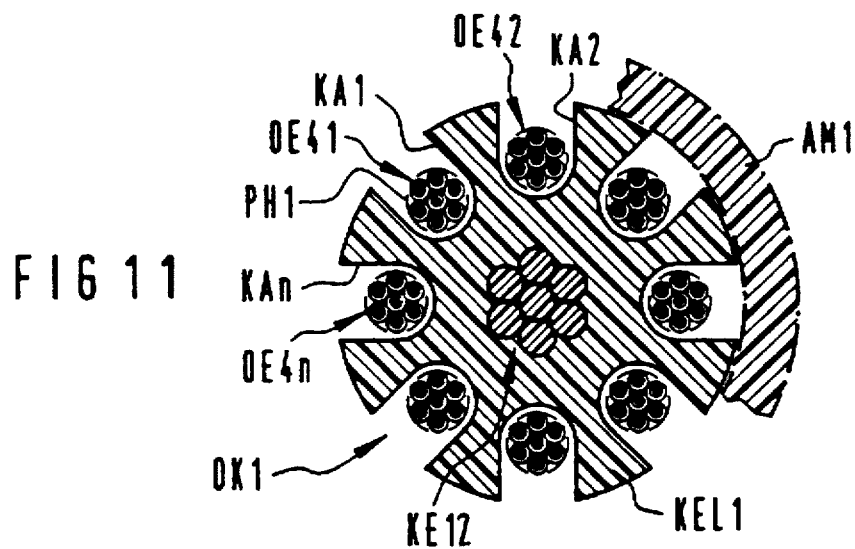
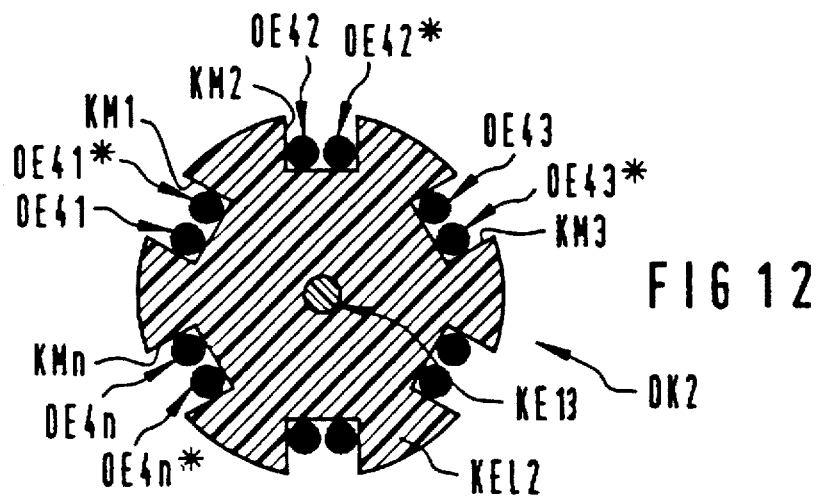

ELONGATED OPTICAL TRANSMISSION ELEMENT

BACKGROUND OF THE INVENTION

The present invention is directed to an elongated, optical transmission element having light waveguides and to an optical and/or electrical lead or cable using the transmission element.

An optical transmission element having a stack formed by a number of light waveguides surrounded on the outside by a protective cladding of, for example, resin seated tightly thereon, is disclosed in German DE 42 11 489 A1. It is only this outer protective cladding that holds the stack together from the outside and the cladding is so firmly fashioned that a buckling of an individual light waveguide or an entire series of waveguides is avoided. Such an additional, outside protective cladding enlarges the cross sectional dimensions of the known optical transmission element beyond the dimensions of the mere stack. This enlargement leads to an inadmissibly large cross sectional dimension under a number of practical conditions.

European Published Application 0 165 632 discloses an optical cable wherein a plurality of light waveguide ribbons are merely loosely stacked one on top of the other to form an approximately rectangular ribbon stack. Such a non-interconnected ribbon stack can tend toward unstable behavior given potentially attacking transverse pressure stresses. Thus, for example, the ribbons, which lie loosely one upon the other, can leave the stack unimpeded given potentially occurring bending stresses and can proceed into inadmissible positions. This can potentially lead to a microbending and, thus, increase the attenuation of the light waveguides in the ribbon. In addition, for example, the bendability of the light waveguides of the respective ribbon in the stack is locally dependent and, therefore, differs.

SUMMARY OF THE INVENTION

The present invention is based on the object of offering an optical transmission element having an optimally compact light waveguide structure, wherein the light waveguides retain their local positions in an optimally defined fashion under a number of practical conditions. According to this invention, this object is achieved in an optical transmission element having several light waveguides which are continuously mechanically connected to one another to form a structure in various planes extending in a longitudinal direction and that their retention is essentially effected by connections in the inside of the structure.

In that the light waveguides are only mechanically connected to one another continuously, for example continuously along their longitudinal extent and along the inside of the structure in various planes, especially simple as well as compactly constructed sub-units of light waveguides can be formed which have versatility for employment. Due, namely, to the "internal structural connection", for example, an additional outside cladding, which is seated tightly around the structure for holding the light waveguides together, is not required. In addition, an inadmissible eruption or undoing of a light waveguide or of a plurality of light waveguides from this union is largely avoided.

The invention is also directed to an electrical and/or optical lead having at least one of the optical transmission elements. The invention is also directed to an electrical and/or optical cable having at least one inventive optical transmission element.

Other advantages and features of the invention will be readily apparent from the following description of the preferred embodiments, the drawings and claims.

BRIEF DESCRIPTION OF THE DRAWINGS

FIG. 10 is an enlarged end view with portions in cross section of a tenth embodiment of an optical transmission element in accordance with the present invention;

FIG. 11 is an enlarged cross sectional view of an inventive optical cable having at least one optical transmission element according to the present invention;

FIG. 12 is an enlarged cross sectional view of a second optical cable having at least one optical transmission element according to the present invention;

DESCRIPTION OF THE PREFERRED EMBODIMENTS

Figure 1:
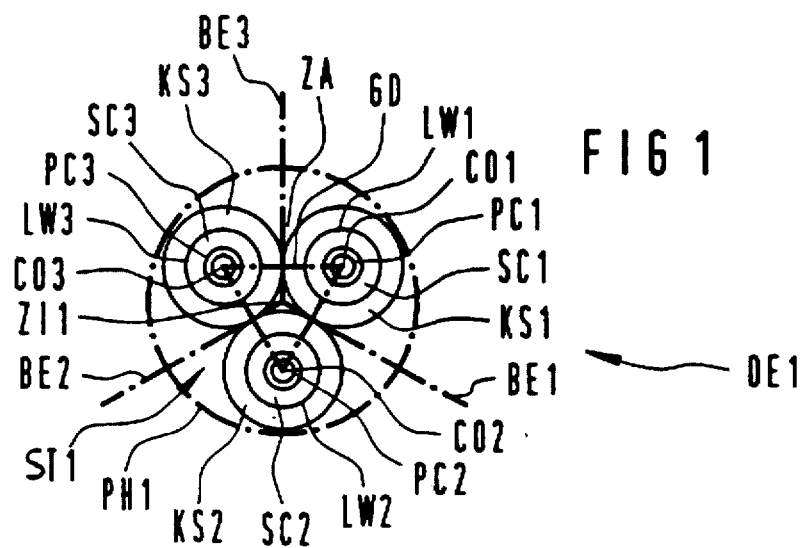
FIG. 1 is an enlarged end view of a first embodiment of the inventive optical transmission element according to the present invention.

The principles of the present invention are particularly useful when incorporated in an optical transmission element, generally indicated at OE1, illustrated in FIG. 1, which is formed of three light or optical waveguides LW1–LW3. This optical transmission element OE1 extends in a longitudinal fashion so that the end view is shown in the plane of the drawing of FIG. 1. The three light waveguides LW1–LW3 preferably each respectively comprise a circular cross sectional shape. A respective optical fiber CO1–CO3 serves the purpose of the optical message transmission and is provided as the core or, respectively, center of each of the light waveguides LW1–LW3. The optical fibers CO1–CO3 preferably each respectively comprise a glass core in the center as well as a standard cladding glass material therearound. They are each respectively coated with at least one outer plastic coating sheath on all sides. A first, inner plastic coating sheath or primary coating PC1–PC3 is preferably applied to the respective optical fiber to surround the fiber, and then a second outer secondary coating or sheath SC1–SC3 is applied thereon. The material of the primary coating PC1–PC3 preferably is a softer plastic than the plastic material of the secondary coating SC1–SC3 in order to cushion the bare optical fiber from potential mechanical stresses. As warranted, it can likewise already be adequate to merely surround the respective optical fiber with a single protective layer, particularly with one which is soft, as a primary layer.

The three light waveguides LW1–LW3 of FIG. 1 each have their respective outside circumferences surrounded on all sides with an adhesive layer or adhesive sheath KS1–KS3. The application of the respective adhesive layer KS1–KS3 can occur, for example, by extrusion. It can likewise be expedient to draw the light waveguides LW1–LW3 through an immersion bath and to thereby apply or continuously distribute the adhesive, respectively, all around the outside circumference of the respective light waveguides LW1–LW3 while moving in the longitudinal direction. Preferably, the respective adhesive layer is of essentially uniform thickness around the outside circumference of the respective light waveguide, for example, an essentially constant adhesive layer thickness is selected. A glue resin, such as, for example, acrylic resin, is preferably employed as the adhesive. This glue resin can preferably be an ultraviolet or U-V curing resin or a heat-curing resin, as well. Standard coating resins for optical fibers are particularly useful. The coating with these coating resins can preferably occur in the same fabrication process as the application of the primary and/or secondary coatings. Expediently, the layer thickness of the adhesive is kept as low as possible in order to obtain an optimally high adhesive effect of the adhesive material and, thus, an optimally high retaining force.

Expediently, the respective adhesive layer comprises a layer thickness between 1/100 and 1/10 times, particularly between 1/50 and 1/30 times, the outside diameter of the light waveguide. Given light waveguides having an outside diameter of approximately 250 μm, the layer thickness is preferably selected between 2.5 μm and 25 μm, and preferably between 5 μm and 8 μm.

The three preferably approximately identically fashioned light waveguides LW1–LW3 are positioned in FIG. 1 at the three corners of an imaginary, particularly essentially equilateral triangle, which is entered in dot-dashed lines for the sake of a better illustration and is provided with the reference character GD. In FIG. 1, for example, the triangle has its base with two corners above the tip or other point so that the tip is extending in a downward direction. The light waveguide LW1 is thereby seated in the right-hand triangle corner of the base, the light waveguide LW3 is seated in the left-hand triangle corner of the base, and the light waveguide LW2 is seated in the tip of the imaginary triangle GD. The light waveguides LW1–LW3, respectively, abut one another at those regions or locations of their circular outside circumference provided with adhesive that lie essentially in the middle of the respective leg and, thus, on the bisectors BE1–BE3 of the side of the imaginary triangle GD. The side bisectors BE1–BE3 thus each respectively proceed roughly tangentially relative to the outside border of the preferred annular adhesive layers KS1–KS3. Thus, the light waveguides LW1–LW3 are continuously mechanically connected to one another in three different connecting planes via the respectively externally applied adhesive layers KS1–KS3 at the adjoining contacting location in the inside of the triangular configuration or, respectively, structure ST1. These three planes, as illustrated in FIG. 1, extend along the side bisectors BE1–BE3 of the imaginary, equilateral triangle GD. As illustrated in FIG. 1, which also could be a cross sectional view, the adhesion of the two abutting light waveguides to one another is preferably respectively already effected by a "two-point" seating of their adhesive layers. To that end, it is adequate to preferably respectively apply only a paper-thin adhesive layer onto the light waveguides LW1–LW3. Thus, for example, the light waveguide LW1 has its adhesive layer KS1 adhering to the adhesive layer KS2 of the light waveguide LW2 as well as to the adhesive layer KS3 of the light waveguide LW3, only at the local contact zone in the middle region of the respective triangle leg. Each light waveguide LW1–LW3 is thus mechanically connected to the two other light waveguides at respectively two adhesion locations or, respectively, adhesion zones in the remaining two corners of the equilateral triangle GD. The respective mechanical connection of two adjoining light waveguides to be held together, such as, for example, LW1/LW2, LW2/LW3, LW3/LW1, as viewed in the longitudinal direction is thus effected by a line-like, particularly straight-line contact zone section, of their adhesive envelopes.

In this way, the individual light waveguides, such as, for example, LW1–LW3, form a multi-dimensional composite structure whose cohesion is essentially accomplished by internal structural connections in at least two connecting planes, such as, for example, BE1–BE3.

An axially symmetrical arrangement of respectively two light waveguides thus preferably occurs for the structure ST1, for example, in detail, the light waveguide pairs LW1/LW3, LW1/LW2, LW2/LW3, with respect to the respectively allocated side bisectors BE1–BE3 and, thus, angle bisectors as well of the imaginary equilateral triangle GD. The three angle bisectors BE1–BE3 essentially represent equivalent bending axes or, respectively, bending planes for the overall structure ST1 as viewed in the longitudinal direction of the structure, so that the structure ST1 is approximately identical or, respectively, uniformly bendable on all three sides of the imaginary equilateral triangle GD and, thus, in a circumferential direction. The three individual light waveguides LW1–LW3 are thus combined to form an essentially uniform structure, for example an overall structure occurs for which the individual light waveguides are equivalently arranged with a defined sequence. Single-sided privileged bending directions are thus largely particularly avoided for such a structure. Viewed overall, namely, the equilateral triangular structure represents a first approximation to a circular or, respectively, rotationally symmetrical light waveguide arrangement that is, thus, identical on all sides. The light waveguides thus comprise essentially identical mechanical properties within the structure under a variety of practical conditions, particularly the same bendability with respect to their connecting planes as well as the same optical transmission behavior, particularly the same optical attenuation.

Viewed differently, a triangular structure is formed within which a first layer of the light waveguides is represented by a light waveguide LW2, a second layer is formed by two light waveguides LW1 and LW3 mechanically connected to one another in whose gore or, respectively, interspace the light waveguide LW2 is positioned in a space-saving fashion. Expressed in practical terms, thus, at least one mechanical connection that effects the cohesion of a plurality of layers is additionally provided between at least two layers or, respectively, planes of light waveguides that directly abut one another.

Viewed overall, an independent, especially compact subunit or structure thus occurs, for example a skein of light waveguides. Within this structure ST1, the light waveguides LW1–LW3 are constantly and continuously firmly connected to one another in a longitudinal direction in a definable series or sequence. The cohesion of the light waveguides, such as, for example, LW1–LW3, thereby occurs essentially merely due to the mechanical connection, particularly due to the gluing between the individual light waveguides LW1–LW3 in the inside of the structure, such as, for example, ST1, so that the outside cladding seated on the structure is not required for holding the light waveguides together. Since, in particular, the light waveguides are only separated from one another by an optimally thin adhesive layer, for example are packed as tightly together as possible and, thus, immediately abut one another, the light waveguides advantageously lie at a slight distance from the neutral bending axis in the center of the structure. As a result thereof, the light waveguides are subjected to no inadmissible tension or other inadmissible mechanical stresses, for example during further processing of the structure.

The structure ST1 of FIG. 1 can already be advantageously formed by a group of individual light waveguides that are only provided with adhesive on their actual contacting surfaces, for example only in the region of their abutting outside surfaces and not all around their outside circumference. An especially compact light waveguide structure can therefore be advantageously formed that, in particular, is free of adhesive and, thus, clean along the outside. This facilitates the manipulation of such a structure and saves glue material. In addition, a specific light waveguide can be separated from the glued composite of such a sub-unit in an especially simple, as well as intentional, way by a service personnel, for example in cable customizing, particularly splicing of light waveguides or during measuring.

An additional improved adhesion of the light waveguides to one another can be expediently achieved with the assistance of an adhesive layer web between the respective two abutting light waveguides in the region of the bending axes BE1–BE3 of the structure ST1. This adhesive layer web expediently extends planarly, particularly strip-shaped or, preferably, on a straight line as viewed in the longitudinal direction. To that end, it can be potentially expedient to fill the inner gore ZI1 in the center of the structure ST1 of FIG. 1 with an adhesive. A type of closed triangular block fully filled at the inside is formed in this way. This further improves the adhesion of the light waveguides to one another. An inadmissible buckling or even rupturing of an individual light waveguide is thus especially reliably avoided.

In addition to or independent thereof, it can also be potentially advantageous to fill the outer gore ZA between the respective two neighboring light waveguides, such as, for example, LW1 as well as LW3, with an adhesive in order to further enlarge the adhesion area and, thus, the adhesive effect of the light waveguides relative to one another. To that end, the structure is expediently conducted overall through a through-opening of an extruder injection head whose inside shape essentially corresponds to the triangular outside contour of the structure ST1. In this way, an improved cohesion of the light waveguides is effected between the individual light waveguides in various positional planes, for example locus positions, and, thus, merely on the basis of mechanical connections in various contacting or, respectively, connecting planes in the inside of the structure. Compared thereto, it is not required for holding the light waveguides together to entirely cast the structure out with adhesive on all sides, for example the light waveguides LW1–LW3 in the corners of the triangular configuration form at least a part of the outside boundary of the structure.

Expediently, the adhesion of the adhesive layers KS1–KS3 to one another is selected so that a relative positional modification of an individual light waveguides relative to the other light waveguides of the structure or even an eruption or release of an individual light waveguide or of a sub-group of the light waveguides from this glued union is largely avoided. What is particularly largely avoided is that the individual light waveguides separate from one another in an uncontrolled fashion during their further processing as a sub-unit to form a cable or given the later, intended employment of such a cable. Given the potential bending of the structure, such as, for example, when winding the structure onto a supply reel or when placing the structure into chambers of an optical cable for cabling, the light waveguides LW1–LW3 can therefore shift relative to one another, preferably only to such an extent as allowed by the elasticity as well as by the plastic deformation of the adhesive, particularly the adhesive resin. Since the respective adhesive layer between the individual light waveguides LW1–LW3 is preferably selected optimally thin, the individual light waveguides LW1–LW3 can shift only extremely slightly relative to one another. A buckling or eruption of individual light waveguides from their glued union and, thus, an increase in attenuation as well are largely avoided in the light waveguides, particularly due to the microbending and/or macrobending. The defined message or, respectively, information transmission properties of each and every individual light waveguide are thus also preserved as an independent communication cable within the glued union. The positional modifications between internally disposed and externally disposed light waveguides with respect to the neutral bending axis of the respective structure, which modification occurs with a given potential bending of the light waveguides, are thus preferably absorbed for the most part by slight compression and elongation of the light waveguides.

The light waveguides LW1–LW3 adhering directly to one another thus form a block-shaped or skein-shaped unit having a plurality of connecting planes on the inside. Due to this "multi-dimensional" cohesion, an especially small overall cross section of the composite structure ST1 is provided. The structure ST1 preferably comprises a maximum cross sectional width between 0.1 mm and 5 mm, particularly between 0.3 mm and 0.9 mm, and preferably between 0.5 mm and 0.8 mm.

As a result of the combining of the light waveguides, the waveguides are assigned a defined sequence within the structure, for example they are arranged therein in a defined fashion. The light waveguides also essentially retain their defined sequence, for example relative position compared to one another, given potential stressing of the structure. As a result of the group-by-group combining of a plurality of light waveguides, the structure allows an especially simple identification of individual light waveguides, even given an extremely high number of fibers per sub-unit. To that end, the individual light waveguides of the respective sub-unit are preferably provided with different colorants or other individual, distinguishing features. Thus, for example, the respective adhesive sheath KS1–KS3 can comprise color pigments that differ from one another. For better distinction between a plurality of such sub-units, which have a plurality of individual light waveguides that are the same or different, from one another, it can be especially expedient in addition to or independent of such an individual identification of the light waveguides to also surround the respective structure or sub-unit itself with an additional characteristic envelope on the outside, for example, to undertake a group identification. In the end view of FIG. 1, the "3's structure" of the light waveguides LW1–LW3 is enveloped, for example, by an annular envelope PH1, which is indicated in dot-dashed lines in FIG. 1. The envelope PH1 preferably merely serves the purpose of identifying the group structure compared to other sub-units that may be potentially present. To that end, the respective outside envelope can, for example, be correspondingly colored, comprise a labeling or other identification, such as, for example, ring identifiers, bar codes, engravings or the like. The inside diameter of the preferably approximately cylindrical envelope PH1 is expediently selected so that it largely corresponds to the maximum cross sectional width of the structure ST1 and, thus, to the triangular height thereof. As a result thereof, the envelope PH1 respectively lies directly at the outside circumference of the three light waveguides LW1–LW3, which are surrounded with a glue layer at three seating regions, particularly seating points, in the region of the corners of the triangular configuration so that an especially compact overall structure occurs.

It can be potentially expedient for an even more compact overall structure to select a triangular geometrical shape for the outer, characteristic envelope, for example the outer envelope is largely matched to the triangular outside contour of the structure and wraps this as tightly as possible. Since the outer envelope PH1 mainly serves only the purpose of identifying the structure, it is particularly adequate to merely apply the envelope PH1 loosely all around the structure tension-free.

The outer envelope PH1 is preferably applied by extrusion of the resin all around the structure. In particular, it is applied in a co-extrusion process simultaneously with potential glue resin for the outside gores of the light waveguide structure. This is advantageous, since a largely stress-neutral material union between the resin for the inner connections and the outer envelope is thus formed. Resins of a silicone base, particularly acrylic resins, are preferably employed as materials for the outer envelope PH1. As warranted, a wound tape, an elastic plastic hose or the like can also be provided as an outside envelope.

It can also be potentially expedient to fashion the envelope PH1 additionally or independent thereof as an at least single-layer or, respectively, single-ply protective cladding that serves the purpose of mechanically cushioning the structure. Expediently, the inside of the envelope PH1 comprises at least one softer, more elastic protective layer as well as at least one harder protective layer at the outside compared thereto. The inner, cushioning protective layer lying against the light waveguides of the structure is, in particular, softer than the secondary coatings SC1–SC3 of the light waveguides. The additional cushioning function of the envelope PH1 largely assures that transverse forces that potentially occur, particularly radially outwardly acting compression forces, are essentially absorbed by the envelope PH1 and cannot directly influence the light waveguides LW1–LW3. The envelope PH1 advantageously sees to it that the forces potentially occurring in punctiform fashion are mechanically damped when viewed in the longitudinal and/or circumferential direction, so that they cannot lead to inadmissibly great fiber bendings or microbendings. The additional envelope PH1, by contrast, distributes potentially occurring punctiform pressure forces so that inadmissible microbending and increases in attenuation, which are potentially connected with microbending, are largely avoided.

Expediently, the layer thickness of the envelope PH1 is selected between 1/25 and 1/3 times, particularly between 1/10 and 1/6 times the outside diameter of the light waveguides. The layer thickness preferably lies between 10 µm and 100 µm, particularly between 20 µm and 80 µm and preferably between 20 µm and 40 µm.

A plastic material is expediently selected for the envelope PH1 that is distinguished by low friction, for example is fashioned optimally smooth, and whose surface, in particular, is optimally low in voids or other irregularities. A good glidability of the structure modified in this way in, for example, the respectively allocated chamber or, respectively, in the cavity of an optical cable is assured in this way, particularly at the inside walls thereof. As a result thereof, the sub-unit remains largely free of external stresses in an advantageous way, for example, upon insertion or when pulled into chambers of an optical cable. As warranted, it can also be expedient to directly apply such a glide layer all around the structure on the outside, particularly when the outer, identifying envelope PH1 is omitted. Such a glide layer is particularly expedient given sub-units that are introduced into chambers of a chambered cable without excessive length.

Viewed overall, an inventive optical transmission element OE1 is already formed in this way only by the basic structure ST1. The functionability thereof is thereby essentially defined only by the internal cohesion of the structure. Such an optical transmission element can be versatilely employed in cavities of electrical and/or optical leads or in chambers of electrical and/or optical cables, particularly communication or power transmission cables.

As warranted, the respective structure, such as, for example, ST1 of FIG. 1, can be directly coated with a swellable substance, particularly with a swelling powder or with a gel having swelling particles. Such swelling agents advantageously see to it that the structure can be rendered largely longitudinally water-tight. Such swellable substances can be expediently applied to the outside as well as on the inside on a potentially existing, outer envelope, such as, for example, PH1. Such an additional swellable layer has been omitted from FIG. 1 for the sake of clarity.

It can also be expedient to coat the surface of the respective sub-units, such as, for example, the structure ST1, directly with a foamed plastic in order to additionally cushion the light waveguides LW1–LW3 toward the outside. Alternatively or in combination therewith, a potentially existing envelope at the outside, such as, for example, PH1, can also be coated with foamed plastic. This additionally promotes the cushioning protection for the light waveguides, such as, for example, LW1–LW3.

In FIGS. 2–10, embodiments of the present invention of optical light waveguide structures or configurations are illustrated. Elements that are equivalent in terms of function and functioning are respectively provided with the same reference characters in FIGS. 1–14. In addition, the statements made about an individual structure, such as, for example, ST1 of FIG. 1, can also be respectively preferably transferred to the remaining structures of FIGS. 1–10 and combined with one another.

Figure 2:
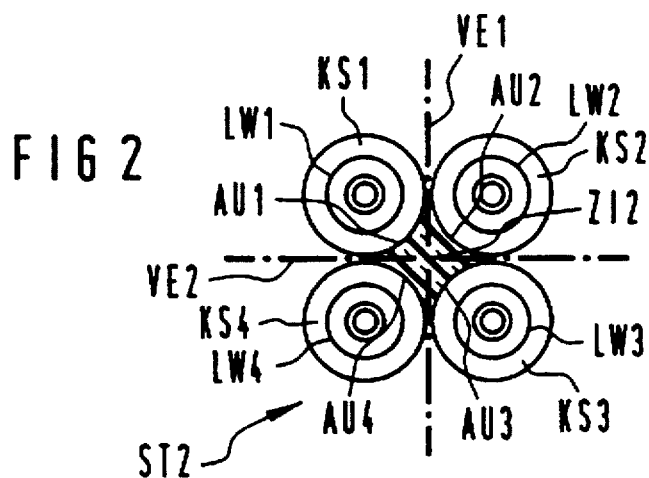
FIG. 2 is an enlarged end view of a second embodiment of the transmission element in accordance with the present invention.

An embodiment of the structure is generally indicated at ST2 in FIG. 2 and differs from the structure ST1 in that it is composed of four individual light waveguides LW1–LW4. In particular, the four light waveguides LW1–LW4 are fashioned analogous to those of FIG. 1 and are preferably likewise respectively surrounded with a corresponding adhesive sheath. The four light waveguides LW1–LW4 are arranged in the four corners of a quadrangle, whereby they respectively abut one another at their outside circumferences, for example they adjoin one another respectively about the middle of an imaginary quadrangle side. A first, lower ply is thus formed by the light waveguides LW3 and LW4, and these are mechanically connected to one another within this lower ply or layer. Thereover, two light waveguides LW1 and LW2 form a second upper ply or layer within which these are likewise joined to one another. A mechanical connection that effects the adhesion of the two plies to one another is likewise formed between the two plies themselves by the adhesive layer of the light waveguide pairs LW1/LW4, LW2/LW3. In this way, a self-contained bonding of the individual light waveguides to one another is obtained and, for example, the individual light waveguides preferably adhere to one another in a plurality of connecting planes in the inside of the structure with the assistance of glue connections. The structure ST2, in the inside, comprises two connecting planes VE1, VE2 residing perpendicularly to one another that extend in the longitudinal direction of the structure. The spatial attitude of these connecting planes VE1 and VE2 is merely indicated by a straight dot-dashed line in the cross sectional view of FIG. 2 for the sake of simplicity. The contacting zones of the light waveguides LW1/LW2 and LW4/LW3 allocated to one another lie approximately axially symmetrically at both sides of the vertically-extending connecting plane VE1 of FIG. 2. With respect to the horizontally-extending connecting plane VE2, the contacting zones of the light waveguides LW1/LW4 and LW2/LW3 allocated to one another lie approximately axially symmetrically. The connecting planes VE1 and VE2 thus correspond to bending planes of the structure ST2.

In particular, it can be expedient to provide an elongated gore element or, respectively, form element ZI2 that is approximately lozenge-shaped in cross section and extends in the longitudinal direction of the structure. This element is provided in the central inside gore of the structure ST2. The gore element ZI2 is co-entered, in addition, in FIG. 2 with dot-dashed lines. This approximately quadrangular, particularly quadratic gore element ZI2 respectively comprises an acceptance depression AU1–AU4 on each side of its outside border or circumference as viewed in cross section. The respective acceptance depression AU1–AU4 is preferably matched in terms of its inside contour to that circular arc of the outside border of the respectively allocated light waveguide that comes to lie in the depression. It can thereby be potentially expedient to provide the acceptance depressions AU1–AU4 with an adhesive layer. The adhesive layers KS1–KS4 of the light waveguides LW1–LW4 can then be potentially omitted. Fiberglass-reinforced or aramid fiber-reinforced plastic or the like is preferably selected as the material for the element ZI2. An especially tensile and, thus, solid light waveguide skein whose light waveguides adhere especially reliably is advantageously formed with the assistance of the element ZI2.

Figure 3:
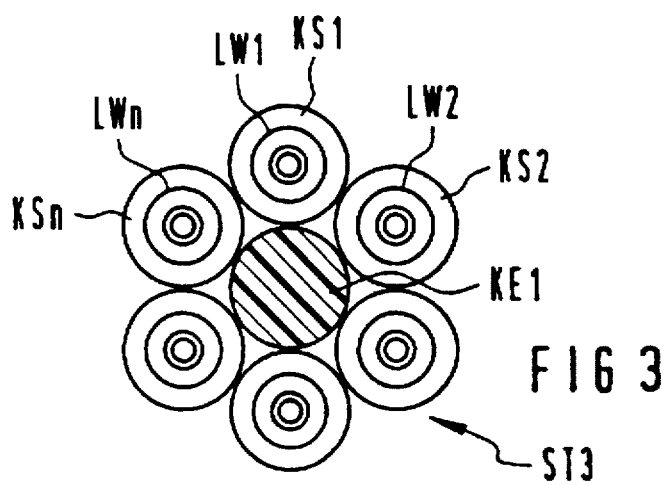
FIG. 3 is an enlarged end view with portions broken away for purposes of illustration of a third embodiment of an inventive optical transmission element in accordance with the present invention.

A third embodiment is generally indicated at ST3 in FIG. 3 and is formed of individual light waveguides LW1–LWn surrounded with an adhesive sheath, as in FIG. 1, and arranged around a core element KE1 that preferably has an approximately circular cross section. The light waveguides LW1–LWn are thereby positioned offset relative to one another by respectively the same circumferential angle in a circumferential direction. Two light waveguides, such as, for example, LW1 and LW2, following one another in the circumferential direction thereby respectively abut against one another. The core element KE1, in particular, is fashioned as a tensile element. It can, for example, be formed by a plurality of aramid, fiberglass, steel wire fibers, a tensile plastic skein or the like stranded to one another. The light waveguides LW1–LWn proceed on an outside circumference of this core element KE1 preferably parallel to the straight-line longitudinal extent of the core element KE1 viewed in the longitudinal direction. In addition, it can also be potentially expedient to, for example, helically strand the light waveguides LW1–LWn around the outside circumference of the core element KE1. This can preferably occur in a long lay or with alternating lay directions, for example with SZ-stranding. In this way, the light waveguides LW1–LWn firmly adhere to one another as a first, outer ply in the form of an annular structure as viewed in the circumferential direction. Respectively, inner, mechanical connections are formed in the circumferential direction with the assistance of the adhesive layers between the annularly adjoining light waveguides. At the same time, the adhesive sheaths of the light waveguides also produce radially inwardly acting connections on the outside circumference of the central core element KE1. A multi-dimensional composite structure thus occurs, for example the light waveguides thereof mutually adhere to one another and/or to the core element in a plurality of inside connecting planes.

Due to the rotational symmetry of the arrangement, it is largely assured that the configuration ST3 comprises essentially the same bending behavior toward all directions as viewed in cross section. Since the light waveguides having an essentially circular cross section are positioned at the outside circumference of the circular core element KE1, an essentially circular overall structure occurs. This circular structure allows the compact accommodation of especially many light waveguides. Such a structure ST3, as an independent, optical transmission element, can preferably be employed in chambers or cavities of electrical and/or optical cables or leads. It can also be potentially expedient to provide an envelope corresponding to FIG. 1 as an outer envelope for identifying the structure ST3.

Figure 4:
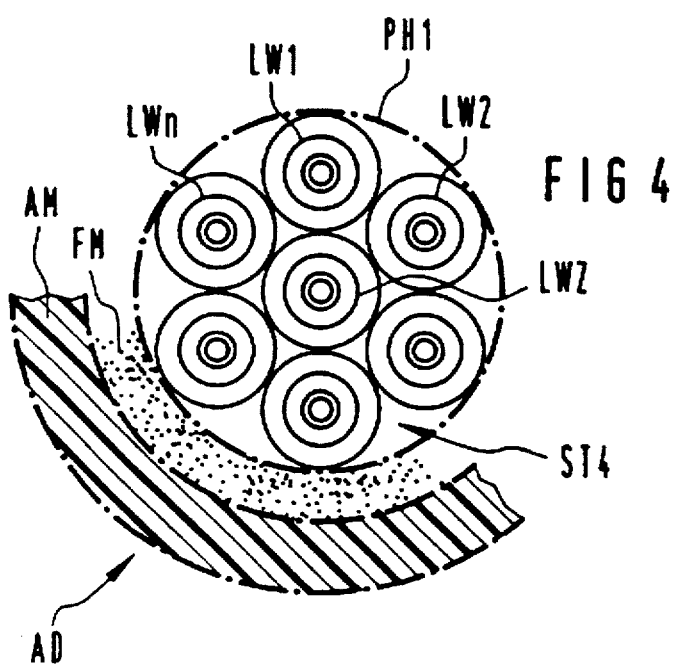
FIG. 4 is an enlarged end view with portions broken away for purposes of illustration of a fourth embodiment of the optical transmission element in accordance with the present invention.

FIG. 4 shows a fourth embodiment of the structure, generally indicated at ST4, which, when compared to the structure ST3 of FIG. 3, has the core element KE1 of FIG. 3 replaced by a central light waveguide LWZ. This light waveguide LWZ is preferably fashioned according to the light waveguides LW1–LWn of FIG. 3 and, in particular, is surrounded with a corresponding adhesive layer. In this way, the light waveguides LW1–LWn adhere both to one another as an outer, annular ply in a circumferential direction as well as to the central light waveguide LWZ in a radial direction. The structure ST4 formed by internal connections in a plurality of planes can be accommodated as an independent optical transmission element, potentially having a plurality of additional correspondingly constructed optical transmission elements, for example the cavity of an electrical and/or optical lead AD. A preferably approximately circular outside cladding AM is illustrated in cross section in FIG. 4 and is only partially shown for the sake of clarity. The outside cladding AM is fashioned single-layer or multi-layer. Plastic is preferably employed for this layer AM. The structure ST4 is thus preferably freely movable in the cavity of the outside cladding AM, for example is accommodated with play or with excess length. It can also be potentially expedient to additionally directly surround the structure ST4 with an envelope PH1, as in FIG. 1, which envelope is shown in dot-dashed lines. In addition, a filling material FM is interposed between the cladding AM and the envelope PH1.

A rotational-symmetrical structure, for example ST3 or ST4, can potentially also comprise more than one annular light waveguide layer. In addition, it can also potentially already be adequate to provide adhesive therein only at the light waveguides where these mutually contact one another, for example the adhesive is provided only at the actually abutting outside surfaces of the light waveguides and not all around their outside circumference. In addition thereto, a composite structure can likewise readily be formed in that the light waveguides adhere to one another only in a circumferential direction and/or adhere to the central core element only in the radial direction.

An inventive structure, for example corresponding to FIG. 4, can be constructed especially simplified in that individual light waveguides are "clotted together" in a longitudinal direction with the assistance of a bonding agent, such as, for example, an adhesive resin. The structures having a circular or quasi-circular cross sectional shape are already especially expedient. In particular, filling the inner gores and/or outer gores of the structure with adhesive resin is expedient.

Figure 5:
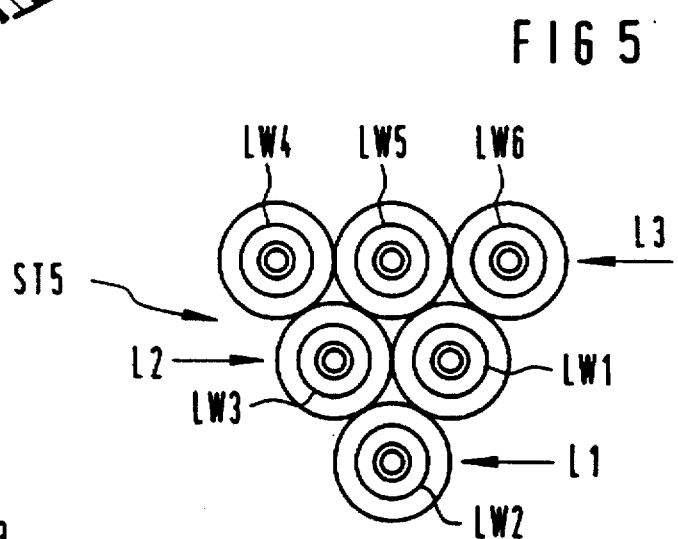
FIG. 5 is an enlarged end view of a fifth embodiment of an inventive optical transmission element in accordance with the present invention.

A fifth embodiment of the structure is generally indicated at ST5 in FIG. 5 and has a triangular configuration that is expanded compared to the triangular configuration of the structure ST1 of FIG. 1. In addition, an additional layer L3 of light waveguides LW4–LW6 is now seated on the top of the two-layer configuration of the structure ST1 of FIG. 1. A layer L2 of the light waveguides LW3/LW1 as well as a layer L3 of waveguides LW4/LW5/LW6 are respectively arranged adhering to one another in a row along a straight-line connecting line, whereby they respectively en gage into the gore or, respectively, gaps of the following neighboring layer. The configuration ST5 is thus formed in that the three layers L1–L3 are arranged above one another and have the light waveguides LW2, LW1/LW3 as well as a layer having the waveguides LW4/LW5/LW6 are respectively staggered relative to one another. In detail, the light waveguide LW2 of the first layer L1 is seated in the gore or, respectively, interspace between the two light waveguides LW1 and LW3 of the second layer L2. The light waveguides LW3 of the second layer L2 is, in turn, seated in the gap between the two light waveguides LW4 and LW5 of the uppermost layer L3 and the light waveguide LW1 of the second layer L2 is seated in a gap between the light waveguides LW5 and LW6 of the third layer L3. Viewed overall, a preferably approximately equilateral triangle is thus again formed as a multi-layer, particularly three-layer overall configuration. Neighboring light waveguides thereby respectively adhere directly to one another with their adhesive layers at their adjoining contacting locations in the inside of the structure ST5 so that a compact structure is obtained. Expediently, this configuration ST5 can be surrounded by a triangular envelope as an identifying envelope analogous to the outer envelope PH1 of FIG. 1. Such an envelope has been omitted from FIG. 5. Of course, it is possible to construct triangular structures having a plurality of light waveguides that is greater compared to the configuration ST1 or ST5. From one layer to the next higher layer, such a triangular structure respectively comprises a great plurality of light waveguides in the respectively next higher layer. The light waveguides can also be potentially joined to form structures having non-equilateral triangular shape, i.e., a triangular shape with unequal sides.

Figure 6:
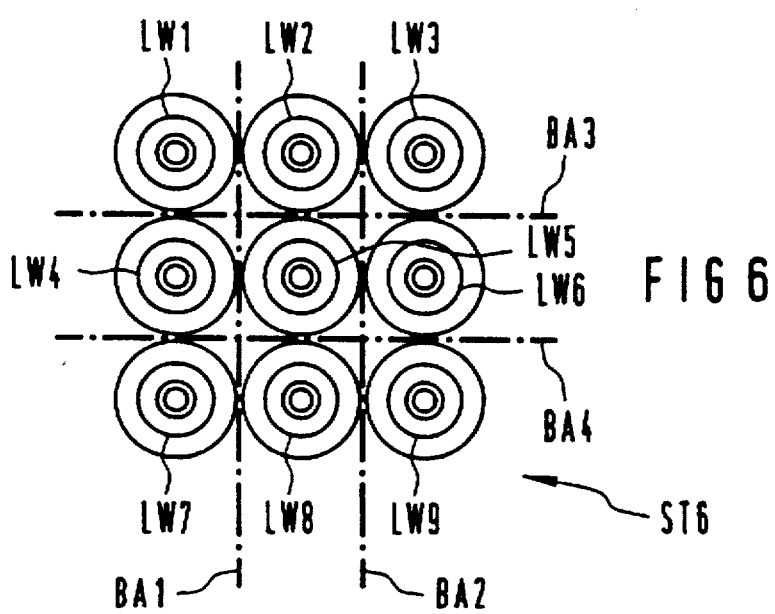
FIG. 6 is an enlarged end view of a sixth embodiment of an optical transmission element in accordance with the present invention.

A sixth embodiment is generally indicated by the structure ST6 in FIG. 6 and is an expansion of the structure ST2 of FIG. 2 by using three layers of three waveguides each. The light waveguides of the respective row, for example, are thus respectively joined to one another along an imaginary straight-line connecting line in a horizontal direction. Layers with the light waveguides LW1/LW2/LW3, LW4/LW5/LW6 as well as LW7/LW8/LW9 are respectively preferably positioned and layered one above the other roughly parallel to each other. In particular, the three rows lie stacked approximately congruently on top of one another so that three parallel, straight-line light waveguides lying side-by-side occur in the vertical direction as well. The light waveguides are preferably respectively fashioned according to those of FIG. 1 and are provided with an adhesive layer on all sides. Within the respective layer, they are mechanically connected to one another to form an independent sub-unit. This is achieved, for example, in that the light waveguides within the respective layer are surrounded with an adhesive envelope, like the light waveguides in FIG. 1, and are pressed against one another. Alternatively or in addition thereto, the light waveguides of the respective row can also be embedded into a common outside sheath, such as, for example, into a plastic cladding in a light waveguide ribbon. The connection between the three individual layers of FIG. 6 is preferably enabled by the individual adhesive sheath of the respective light waveguide in the respective layer. Additionally or independent thereof, an additional continuous adhesive layer can be separately provided between the individual layers. Given a common outside sheath of the light waveguides of the respective layer, it is expedient to coat this with adhesive with a large-surface area as possible at its inside relative to the next layer. Preferably, the interspaces between the layers can likewise be filled with adhesive in the inside and/or the gaps in the outside region of the structure ST6. The light waveguides of the individual layers of FIG. 6 respectively firmly adhere to one another at their inner adhesive seating surfaces within the respective layer as well as at the contacting surfaces of the light waveguides of the neighboring layer, so that, viewed overall, a square approximately occurs as a structural cross sectional shape. This quadratic configuration advantageously allows an especially compact, space-saving arrangement of the light waveguides.

As a result of the symmetry of the arrangement, the formation of only a single, privileged bending plane is thereby largely avoided. On the contrary, the at least two inner connecting planes for the light waveguides also preferably correspond to bending planes of the structure. As viewed in cross section, these connecting planes appear as connecting lines. In particular, the quadratic structure of FIG. 6 seems to have at least four equivalent bending axes. In detail in the view of FIG. 6, for example, the two vertically proceeding bending axes BA1 and BA2, as well as the two bending axes BA3 and BA4 that extend perpendicular thereto and are horizontally axes indicated in dot-dashed lines. In the cross sectional view of FIG. 6, the bending axis, i.e., connecting line BA1, proceeds in the vertical direction centrally between the two neighboring rows LW1/LW4/LW7 and LW2/LW5/LW8 extending in the vertical direction and parallel to these rows. The bending axis BA2 proceeds in a vertical direction centrally between the two neighboring rows LW2/LW5/LW8 and LW3/LW6/LW9 extending in the vertical direction and, thus, likewise proceed parallel to this direction. Analogous thereto, the bending axis BA3 extends in the horizontal direction between the rows LW1/LW2/LW3 and LW4/LW5/LW6 and parallel to these rows. The bending axis BA4 proceeds parallel thereto between the rows LW4/LW5/LW6 and LW7/LW8/LW9. The bending axes BA2/BA1 thus reside perpendicular relative to the bending axes BA3/BA4. Given the three-dimensional consideration of the structure ST6, an unintentional release of the individual light waveguides from this union is largely opposed by the inner structural connections of the light waveguides to one another in the various planes, for example particularly by the connecting lines BA1–BA4 in the cross sectional view of FIG. 6. In practice, it can also be potentially expedient to hold the light waveguides together not in the form of a quadratic stack, but to connect them to one another in the form of some other rectangular structure.

Figure 7:
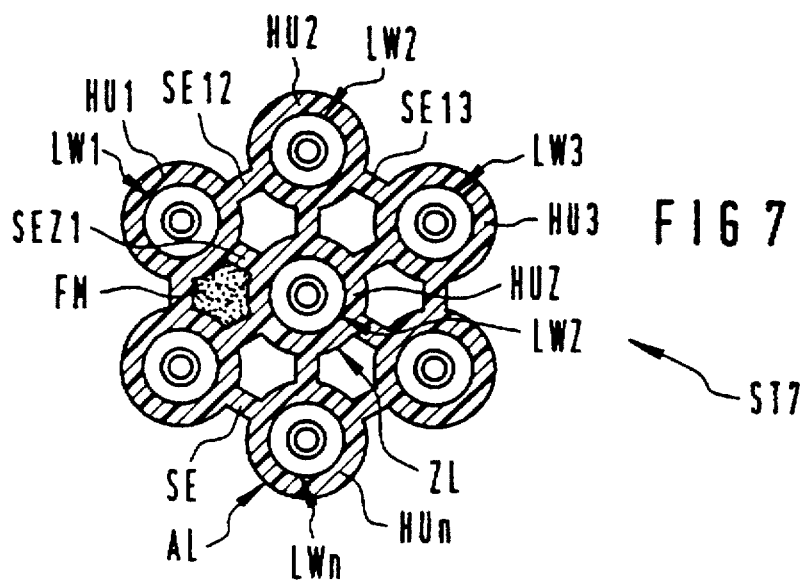
FIG. 7 is an enlarged cross sectional view of a seventh embodiment of an optical transmission element in accordance with the present invention.

The seventh embodiment is generally indicated at ST7 in FIG. 7 and, unlike the embodiments of FIGS. 1–6, a mechanical connection on the inside of the structure is obtained by cross-axial webs. These webs preferably extend continuously in the longitudinal extent of the structure. The light waveguides LW1–LWn are preferably annularly arranged around the light waveguide LWZ at the core of the structure. The individual light waveguides LW1–LWn in this outer layer are mechanically connected to one another in the circumferential direction with the assistance of cross-axial webs at their outer envelopes. To that end, the light waveguides LW1–LWn, instead of being provided with an adhesive layer according to the embodiment of FIG. 1, are respectively expediently additionally surrounded by a preferably extruded plastic outer sheath HU1–HUn that comprises cross-axial webs along the outside circumference. With respect to the longitudinal extent of the respective light waveguides, these webs point radially outward. The respective light waveguides in the outer layer thus respectively comprise connecting webs to the outside sheaths of the neighboring light waveguides at its plastic outside sheath transversely relative to the axial longitudinal extent of the structure ST7. These connecting webs create an actual cohesion of the light waveguides in a circumferential direction of the structure. In particular, the webs are injected or simultaneously extruded onto the plastic outside sheaths. In such a structure, the light waveguides can also be only subsequently pulled into the tubular outside sheaths HU1–HUn as well as the sheath HUZ. By way of example, the light waveguide LW2 in FIG. 7 is connected via the web SE12 to the outside sheath HU1 of the immediately neighboring light waveguide LW1 and is also connected via the web SE13 to the outside sheath HU3 of the light waveguide LW3 that follows in a circumferential direction. A flexible elastic plastic material is preferably selected for the webs, such as, for example, SE12 and SE13, as well as for the plastic outside sheaths, such as, for example, HU1–HUn and HUZ. In particular, an elastically viscous filling or gluing compound in which the respective light waveguide is embedded is also suitable for the outside sheath.

A mechanical connection in the radial direction for the light waveguides LW1–LWn toward the center waveguide LWZ in the center of the structure ST7 is likewise obtained by cross-axial webs. In FIG. 7, for example, the sheath HU1 around the light waveguide LW1 is connected to the sheath HUZ around the center waveguide by a radially extending web SEZ1. The analogous case applies to the other light waveguides of the outer layer. In this way, a structure of light waveguides viewed overall is obtained that are preferably connected to one another with the assistance of cross-axial webs directed on the inside of the structure. With a given web length, the light waveguides thus lie at a defined spacing from one another.

An unintentional stripping or release of the light waveguide from the structure is thus largely avoided as a result of the web chaining, particularly given potential bending stresses. The configuration or, respectively, structure ST7 thus essentially behaves like a flexible elastic, solid skein. Due to the inner cross connections, the predetermined order of the light waveguides is preserved in this skein, for example the light waveguides are prevented from changing places.

The webs, such as, for example, SE12, can be potentially simultaneously employed for identifying the structure ST7 from other sub-units that are potentially present. To that end, the webs are expediently colored with specific colors or are provided with other characteristic identifiers. Different colors for discrimination within the structure ST7 can be preferably allocated to the light waveguides LW1–LWn and the center waveguide LWZ. The structure ST7, viewed in a simplified fashion, is thus constructed in the fashion of a spider web network. It respectively combines or unites a group of a plurality of light waveguides to form a unit, with the waveguides adjoining one another in various spatial planes. The multi-member nature of the structure advantageously assures that a plurality of bending axes are offered between the individual light waveguides. During assembly, the webs, such as, for example, SE12, SE13, make it possible in a simple way to respectively release an individual light waveguide, such as, for example, LW1, from this union, which has the waveguides chained to one another. The webs thereof are simply parted for that purpose.

Potentially, the additional plastic outside sheaths of the light waveguides can also be omitted. The light waveguides are then preferably glued directly at the end faces of the webs.

It can also be expedient to fill the cavities in the inside of the structure ST7 with a filling compound in order to preferably render the structure longitudinally water-tight. With such a web connection, a light waveguide structure having at least two, particularly a plurality of connecting planes as well as with different configurations and shapes, can thus be constructed.

A tenth embodiment, generally indicated at ST10 in FIG. 10, is a modification of the embodiment ST7 of FIG. 7. In this embodiment, connecting webs, such as, for example, SE1, SE2, SE3, as well as SE4, extend merely radially outwardly viewed in cross section at a central, preferably approximately circular, core element, such as, for example, KE11, which is similar to the core KE1 of FIG. 3. A spoke-like or, respectively, star-like structure is, thus, obtained. The connecting webs or spokes and/or core element KE11 are preferably fashioned of a flexible elastic, particularly a rubber-elastic. In particular, the core element KE11 is a tensile element, preferably manufactured, for example, of fiberglass-reinforced plastic. The radial webs SE1–SE4 are preferably extruded onto the core element in a longitudinal direction and are about equal length in the radial direction. Respectively, one light waveguide LW1–LW4 is allocated to the radially outer end of each of the webs SE1–SE4 and are preferably glued thereto or mechanically connected thereto in some other way. The radial webs are preferably attached to the core element KE11 offset by about the same circumferential angle.

Figure 8:
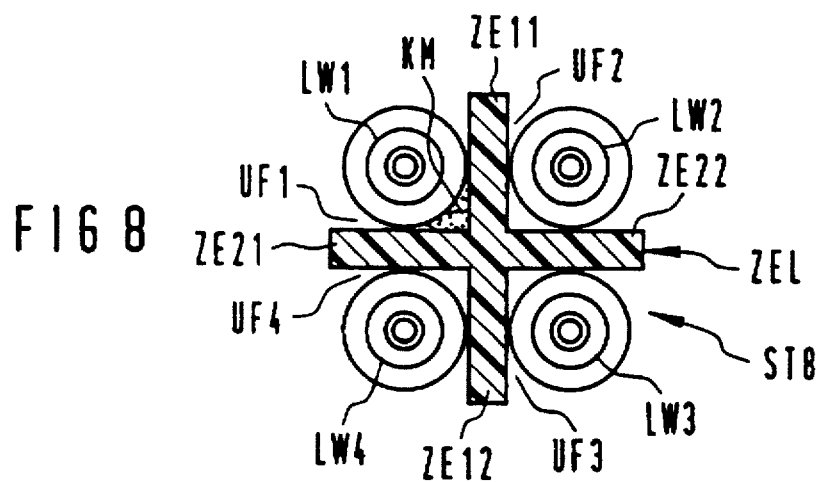
FIG. 8 is an enlarged end view with portions in cross section of an eighth embodiment of an optical transmission element in accordance with the present invention.

An eighth embodiment is generally indicated at ST8 in FIG. 8 and is a modification of the second embodiment ST2 of FIG. 2. In FIG. 8, an intermediate element extending in a longitudinal direction is now additionally inserted along the respective connecting plane VE1, VE2 of FIG. 2 and, therefore, respectively, between the two neighboring light waveguide layer levels. In detail, a separate intermediate element ZE21 or ZE22, particularly a reinforcing element, extends along the horizontal connecting plane VE2 and is provided between the upper and lower layer plane of the light waveguide pairs LW1/LW4 and LW2/LW3. A separate intermediate element ZE11 or ZE12 respectively extends perpendicular to the combined element ZE21/ZE22 between the left-hand and right-hand layer planes of the light waveguide pairs LW1/LW2 and LW4/LW3 and, thus, extend along the vertical connecting plane VE1. The four intermediate elements ZE11, ZE12, ZE21 and ZE22 combined with one another preferably form a single-piece, cross-shaped intermediate skeleton ZEL having a longitudinal, as well as a transverse, branch residing perpendicular to one another. The longitudinal transverse branches are preferably of about equal length and respectively intersect one another roughly in the middle of their longitudinal extent. This cross-shaped structure ZEL thus forms four outwardly open sub-division fields UF1–UF4 having, in particular, a quadratic cross sectional shape. In detail, the sub-division field UF1 occurs in the region between the left-hand sub-half ZE21 of the cross branch and the upper sub-half ZE11 of the vertical branch. The sub-division field UF2 occurs between the upper sub-half ZE11 of the vertical branch and the right-hand sub-half ZE22 of the cross branch. The sub-division field UF3 occurs between the right-hand sub-half ZE22 of the cross branch and the lower sub-half ZE12 of the vertical branch, while the sub-division field UF4 occurs between the lower sub-half ZE12 of the vertical branch and the left sub-half ZE21 of the cross branch. What this means, in other words, is that a respective triangular corner is formed between a half of the vertical branch as well as a half of the cross branch. A respective light waveguide is glued fast in each of the triangular sub-division fields. The respective light waveguide thereby adheres to the respectively allocated intermediate element ZE21 or ZE22, preferably with a respective contact zone of its adhesive sheath, and also adheres perpendicularly thereto to the intermediate element ZE11 or ZE12 with a contact zone. Potentially, the corner of the sub-division fields UF1–UF4 can be respectively partially filled with adhesive KM or the respective sub-division can even be entirely filled with adhesive. Plastic, particularly a tensile-type material, is preferably employed for the intermediate element or skeleton ZEL. In particular, the intermediate element is fashioned rubber-elastic so that the neighboring light waveguides in the inside of the structure ST8 are cushioned relative to one another. Since a resilient intermediate layer is inserted between two adjoining light waveguides, a direct abutting of the light waveguides LW1–LW4 is thus avoided in this structure ST8. In this way, the light waveguide structure ST8 is less mechanically sensitive to potential transverse pressure stresses, particularly crushings, than the structure ST2. The respective intermediate layer advantageously reinforces the structure. In particular, the respective intermediate element can be fashioned as a band-like strip extending in a longitudinal direction of the structure. In addition, a service personnel can also release an individual light waveguide from the composite structure ST8 as needed in an especially simple way as a consequence of the intermediate layers, since a separation between the individual light waveguides is already present from the start and the light waveguides do not adhere directly to one another.

It can also be potentially expedient to accommodate the intermediate element, such as, for example, ZE11, ZE12, in the interspaces between respectively two neighboring, adjoining light waveguides independent from one another, i.e., not connected to one another.

Figure 9:
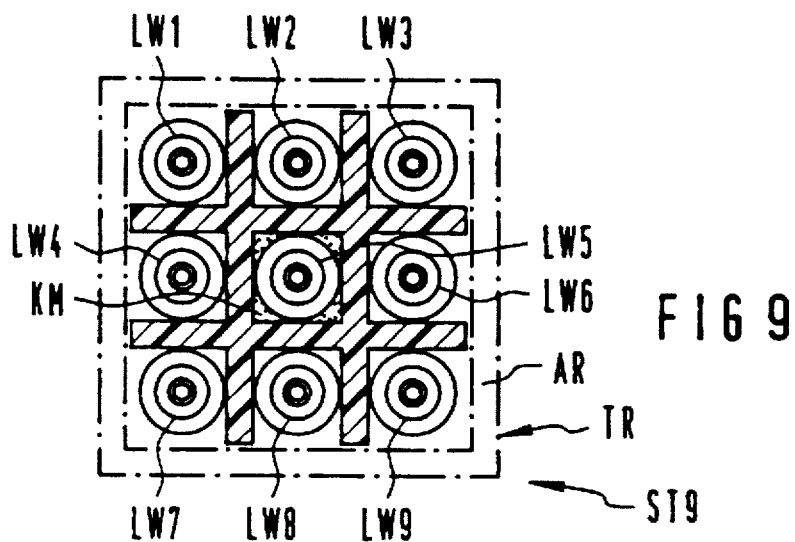
FIG. 9 is an enlarged end view with portions in cross section of a ninth embodiment of an optical transmission element in accordance with the present invention.

A ninth embodiment is generally indicated at ST9 in FIG. 9 and represents a continuation of the structure ST8 given a greater plurality of light waveguides. An intermediate element corresponding to the structure in FIG. 8 is now additionally inserted between two respectively neighboring light waveguides of the arrangement ST6 of FIG. 6 in the region of the bending axes BA1–BA4 of the structure ST6. Given intermediate elements preferably connected to one another, an interconnected, checkerboard-like intermediate skeleton TR occurs having a rectangular, particularly quadratic, field division. Such a one-piece overall skeleton can preferably be extruded of plastic. One light waveguide is preferably allocated to each field and is preferably glued therein. The intermediate skeleton TR advantageously sees to it that the light waveguides remain in place within the structure ST9 and are held together in a firm manner. Potentially, the respective field is filled with an adhesive KM into which the respective light waveguides are then embedded.

In a modification of the light waveguide structure ST9, it can also be potentially expedient to cover those sub-division fields which open toward the outside from the outside. To that end, the structure ST9 is additionally surrounded with a tightly placed rectangular, particularly quadratic, outside frame or tube AR. In this way, all sub-division fields are fashioned analogous to the central sub-division field in the middle of the structure ST9. The honeycomb-shaped structure is thus formed which has sub-division fields closed on all sides to form channels and the light waveguides are preferably pulled or drawn into the closed channels. Each light waveguide is then enclosed in a channel closed on all sides and, in particular, having a rectangular inside cross section and, thus, is retained in the honeycomb structure. A gluing of the respective light waveguides in the allocated channel is thereby preferably no longer required. The remaining cavities in the channels can potentially be filled with thixotropic filling compound for preserving the longitudinal water-tightness. Of course, the light waveguides can also be inserted into the longitudinal channels having a round inside cross sectional shape or other inside contour.

A first embodiment of an optical cable is generally indicated at OK1 in FIG. 11 and includes a chambered element KEL1 of a plastic material which is preferably provided around a tensile core KE12. This chambered element KEL1 has chambers KA1–KAn, which are provided on the outside circumference of the chamber element KEL1 and are preferably offset by the same circumferential or annular angle in the circumferential direction. The chambers KA1–KAn are open radially outwardly and serve the purpose of accepting optical transmission elements OE41–OE4n. These optical transmission elements OE41–OE4n, for example, are fashioned to correspond to their rotationally symmetrical optical structure ST4 of FIG. 4.

It can be just as expedient to insert optical transmission elements according, for example, to the structure ST2 of FIG. 2 into the chambers KA1–KAn. The chambers KA1–KAn preferably comprise a semi-circular chamber floor, for example a semi-circular rounded inside contour radially toward the inside. A more uniform distribution of the forces is thereby obtained along the sub-section of the outside circumference of the respective transmission element that lies at the chamber floor. The inside contour of the chamber floor, namely, is matched to the outside contour of the allocated transmission element that is approximately circular or, respectively, quasi-circular in cross section. In particular, the cross sectional width of the chamber is greater in the circumferential direction than the diameter of the optical transmission elements OE41–OE4n, which are approximately round in cross section. Likewise, the chamber depth is preferably greater than the diameter of the optical transmission elements OE41–OE4n. In this way, the optical transmission elements OE41–OE4n are largely seated with play in their specifically allocated chambers KA1–KAn. Under a plurality of practical conditions as well as external disturbing quantities, such as, for example, potentially acting transverse pressure forces on the optical cable OK1, the transmission elements OE41–OE4n remain largely stress-free, for example essentially force-free, therein. The radius of curvature of the chamber floor is preferably selected between 5% and 20% larger than the radius of the sub-unit to be inserted into the chamber. The chambers KA1–KAn are radially outwardly terminated with the assistance of a single-layer or multi-layer outside cladding AM1, particularly a plastic cladding.

A second embodiment of an optical cable is generally indicated at OK2 in FIG. 12 and includes a chamber element KEL2 of, for example, plastic material which is provided around a preferably tensile element, such as a round core KE13. The element KEL2 has a plurality of rectangular, radially open chambers KM1–KMn on its outside circumference. Respectively, two or more individual optical transmission elements, preferably those described in FIGS. 1–10, are inserted into the chambers KM1–KMn. Pairs of optical transmission elements, such as OE41/OE41*, OE42/OE42*, OE43/OE43* . . . OE4n/OE4n* are each respectively fashioned according to the structure, such as ST4 of FIG. 4, and are preferably placed into the chambers KM1–KMn of FIG. 12. Respectively, the two sub-units are thus accommodated in the respective chamber at the quasi-flat, planar chamber floor. A single-layer or multi-layer outside cladding, as in FIG. 11, is preferably applied around the chamber element KEL2. Such an outside cladding is not shown in FIG. 12 for purposes of clarity.

As illustrated, the chambers of the elements KEL1 and KEL2 extend substantially in the longitudinal direction of the elements. However, these chambers can be helically-extending chambers or can be chambers extending with a reverse lay so that the transmission elements, such as OE41–OE4n, can be placed in the chambers with the assistance of an SZ-stranding. Of course, it is just as easily possible to accommodate at least one inventive optical structure, preferably according to FIGS. 1–10, in the cavities or chambers of the electrical cable or to mix electrical and optical cables.

Figure 13:
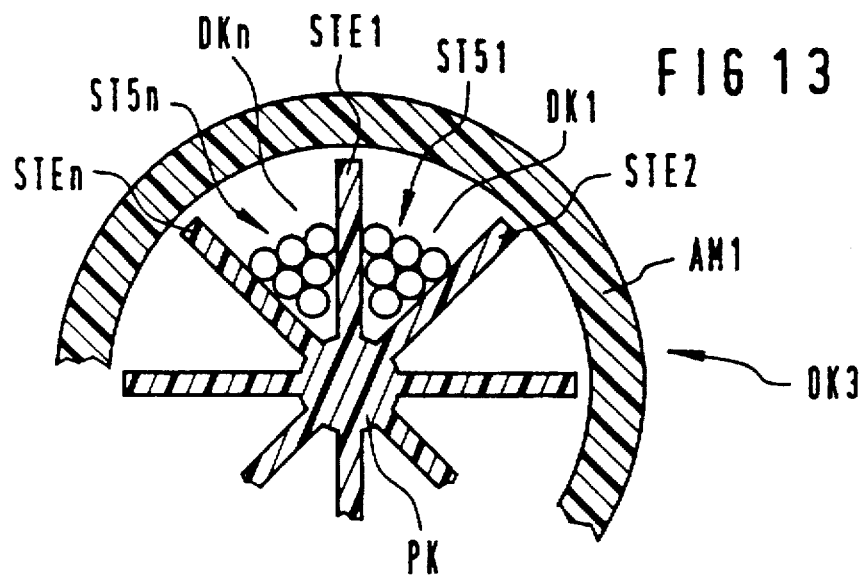
FIG. 13 is a partially enlarged cross sectional view of a third embodiment of an optical cable having at least one optical transmission element in accordance with the present invention.

A third embodiment of a chambered cable is generally indicated at OK3 in FIG. 13. For the sake of simplicity, only a portion of the cable is illustrated. The cable OK3 comprises an approximately cylindrical profiled member PK, which is the cable core, and has radially outwardly extending sub-division webs STE1–STEn so that a spoke-like chambered element occur. An approximately triangular or, respectively, V-shaped chamber, such as, for example, DK1, is formed in this way between two sub-division webs, such as STE1 and STE2, which are adjacent each other when taken in a circumferential direction. This triangular or, respectively, V-shaped chamber is open radially outward. A light waveguide structure, such as ST51–ST5n, has an approximately triangular outside shape which is matched to the shape of the chambers DK1–DKn, which have a triangular inside contour. By way of example, the triangular structures ST51–ST5n are placed into the chambers DK1–DKn in FIG. 13 with these triangular structures corresponding to the structure ST5 of FIG. 5. Since the inside contour of the respective receptacle chamber essentially corresponds to the outside contour of the introduced light waveguide structure, an especially reliable positional securing of the structure is obtained. As illustrated, the profiled member PK is received in a cladding or sheath AM1.

Figure 14:
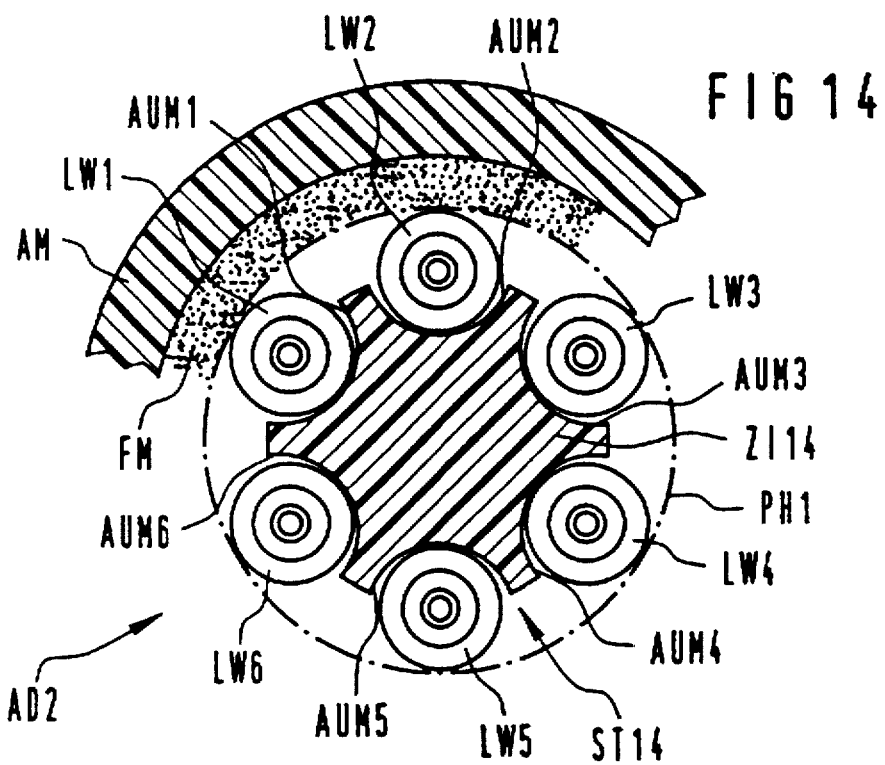
FIG. 14 is an enlarged partial cross sectional view of an optical lead having an optical transmission element according to the present invention.

An optical lead, generally indicated at AD2, having a light waveguide structure, generally indicated at ST14, is shown in FIG. 14. The lead AD2 has a core or gore element ZI14 with an equilateral hexagonal shape disposed in the center of the lead. The outside of the element ZI14 has a respective light waveguide LW1–LW6 allocated to it. The receptacle depressions AUM1–AUM6 are preferably formed in the outside circumference of the element ZI14 for receiving the waveguides. The receptacle depressions particularly comprise an inside contour that approximately corresponds to a circular arc along the outside border of the light waveguides to be placed therein. The light waveguides LW1–LW6 are preferably glued into these receptacle depressions AUM1–AUM6 with the assistance of their adhesive layer. A structure having an especially firm union of the light waveguides will occur in this manner. The structure is preferably accommodated with play in the circular-cylindrical cavity of the lead AD2. The remaining structure of the cavity AD2 particularly corresponds to that of the lead AD1 of FIG. 4 and, therefore, can have an envelope PH1, an outer cladding AM and a filling compound FM between the outer cladding AM and the envelope PH1.

Of course, it is also possible to accommodate more than one light waveguide structure simultaneously in such a hollow lead.

The statements made above for the exemplary embodiments of FIGS. 1–14 are particularly valid, both independently as well as in combination with one another. With the scope of the invention, it can be advantageous to transfer to structures having different configurations, cross sectional shapes as well as with an arbitrary plurality of light waveguides between the above examples.

As warranted, the elongated "dummy" element (spacer holder), such as, for example, a tensile thread or the like, can be provided instead of the light waveguide of the respective structure. The light waveguides are expediently mechanically connected to one another to form a respective structure in different connecting planes, for example, multi-dimensionally. This can be accomplished in various fashions, for example by adhesive, at the light waveguides themselves, as illustrated in the embodiments of FIGS. 1–10 by cross-webs, such as in FIG. 7, or by other mechanical connections. As a result thereof, sub-groups of light waveguides that are already interconnected in advance can be provided. These sub-units are particularly distinguished by the following advantages:

the light waveguides of the respective structures can be reliably identified;

increases in attenuation of the light waveguides due to their combining to form the respective structures are largely avoided;

the respective structures comprise only slight cross sectional dimensions; and the light waveguides remain ordered in defined fashion within the respective structure, even given potential mechanical transverse pressure forces, particularly bending of the structure as a whole.

The inventive light waveguide structures, particularly according to FIGS. 1–10, are preferably suited for insertion into the chambers of chambered cables, into central tube bundled cables, for long lay as well as for SZ-stranding, in flat ribbon cables. For example, the light waveguide structures may be versatilely employed as sub-units in cable technology.

Particularly, when winding the respective, inventive structure onto a supply reel having at least 25 times the diameter of the maximum cross sectional width of the structure, increases in attenuation of the light waveguides is largely avoided.

Although various minor modifications may be suggested by those versed in the art, it should be understood that we wish to embody within the scope of the patent granted hereon all such modifications as reasonably and properly come within the scope of our contribution to the art.

We claim:

1. An elongated optical transmission element comprising individual light waveguides directly abutting one another and being continuously mechanically connected to one another in various planes with an adhesive being additionally provided on adjoining contact surfaces of the waveguides, said adhering individual waveguides forming altogether a skein-like unit of an independent multi-dimensional composite structure extending in a longitudinal direction with the cohesion of the individual light waveguides being essentially and directly accomplished by internal structural glue connections in at least two connecting planes of the individual light waveguides only in the inside of the structure so that the optical transmission element is formed only by said independent multi-dimensional composite structure.

2. An elongated optical transmission element according to claim 1, wherein the light waveguides are free of the adhesive except at the contact surfaces.

3. An elongated optical transmission element according to claim 1, wherein at least one elongated core element is provided on the inside of the structure and the light waveguides are attached thereto.

4. An elongated optical transmission element according to claim 3, wherein the core element, on its outer surfaces, is provided with receptacle depressions for receiving each of the light waveguides.

5. An elongated optical transmission element according to claim 1, which includes a core element, said light waveguides being arranged around said core element.

6. An elongated optical transmission element according to claim 1, wherein the light waveguides are combined overall to form a structure having an optically largely round circular cross sectional shape.

7. An elongated optical transmission element according to claim 1, wherein the structure is additionally surrounded by a common sheath for a common identification of the light waveguides connected to one another.

8. An elongated optical transmission element according to claim 1, wherein the waveguides are arranged so that the structure has at least two essentially equivalent bending axes.

9. An elongated optical transmission element according to claim 1, wherein the light waveguides are arranged in a definite sequence in the structure.

10. An optical lead having at least one optical transmission element, said transmission element comprising individual light waveguides directly abutting one another in at least two planes and being continuously mechanically connected to one another in various planes with an adhesive being additionally provided only on adjoining contact surfaces of the waveguides, said adhering individual waveguides forming altogether a skein-like unit of an independent multi-dimensional composite structure extending in a longitudinal direction with the cohesion of the individual light waveguides to each other being essentially and already accomplished by internal structural glue connections in at least two connecting planes of the individual light waveguides only in the inside of the structure so that the optical transmission element is formed only by said independent multi-dimensional composite structure.

11. An optical lead according to claim 10, which includes an electrical element.

12. An optical cable comprising at least one optical transmission element having a plurality of individual light waveguides directly abutting one another in at least two planes and being continuously mechanically connected to one another in various planes with an adhesive being additionally provided only on adjoining contact surfaces of the waveguides, said adjoining individual waveguides forming altogether a skein-like independent multi-dimensional composite structure extending in a longitudinal direction with the cohesion of the individual light waveguides to each other being essentially and already accomplished by internal structural glue connections on at least two connecting planes of the individual light waveguides only in an inside of the structure so that the optical transmission element of the cable is formed only by said independent multi-dimensional composite structure.

13. An optical cable according to claim 12, which includes electrical elements.

* * * * *